(12) United States Patent
Holt

(10) Patent No.: US 7,970,003 B2
(45) Date of Patent: *Jun. 28, 2011

(54) LOW POWER TELEMETRY SYSTEM AND METHOD

(75) Inventor: Michael D. Holt, Greensboro, NC (US)

(73) Assignee: General Dynamics Advanced Information Systems Inc., Fairfax, VA (US)

( * ) Notice: Subject to any disclaimer, the term of this patent is extended or adjusted under 35 U.S.C. 154(b) by 1860 days.

This patent is subject to a terminal disclaimer.

(21) Appl. No.: 10/859,910

(22) Filed: Jun. 1, 2004

(65) Prior Publication Data

US 2005/0030200 A1 Feb. 10, 2005

Related U.S. Application Data

(60) Provisional application No. 60/474,316, filed on May 30, 2003.

(51) Int. Cl.
H04B 7/212 (2006.01)
(52) U.S. Cl. .......................................... 370/442; 607/60
(58) Field of Classification Search ............... 370/395.4, 370/437, 442, 458; 607/60, 66
See application file for complete search history.

(56) References Cited

U.S. PATENT DOCUMENTS

| H967 H | * | 9/1991 | Mariotti | 370/537 |
|---|---|---|---|---|
| 5,638,358 A | * | 6/1997 | Hagi | 370/228 |
| 5,724,985 A | * | 3/1998 | Snell et al. | 600/510 |
| 5,731,711 A | * | 3/1998 | Gabara | 326/30 |
| 5,941,906 A | * | 8/1999 | Barreras et al. | 607/66 |
| 6,167,560 A | * | 12/2000 | Jenkins et al. | 716/17 |
| 6,223,074 B1 | * | 4/2001 | Granger | 600/544 |
| 6,411,614 B1 | * | 6/2002 | Weigand | 370/347 |
| 6,452,927 B1 | * | 9/2002 | Rich | 370/395.1 |
| 6,728,810 B1 | * | 4/2004 | Ishibashi | 710/124 |
| 6,760,308 B1 | * | 7/2004 | Ghanma et al. | 370/235 |
| 6,792,143 B1 | * | 9/2004 | Harmovaara | 382/189 |
| 6,812,746 B2 | * | 11/2004 | Gans | 327/51 |
| 6,813,220 B2 | * | 11/2004 | Hicks et al. | 367/136 |
| 6,895,016 B1 | * | 5/2005 | Nguyen et al. | 370/437 |
| 6,934,655 B2 | * | 8/2005 | Jones et al. | 702/108 |
| 6,947,795 B2 | * | 9/2005 | Bornhoft et al. | 607/60 |
| 7,103,062 B1 | * | 9/2006 | Erickson et al. | 370/442 |
| 7,428,618 B2 | * | 9/2008 | Najam et al. | 711/147 |
| 7,437,584 B2 | * | 10/2008 | Kao | 713/322 |
| 2002/0019584 A1 | * | 2/2002 | Schulze et al. | 600/300 |
| 2004/0179623 A1 | * | 9/2004 | Huckeba | 375/257 |
| 2005/0207378 A1 | * | 9/2005 | Zaitsu | 370/338 |
| 2006/0132189 A1 | * | 6/2006 | Holt et al. | 327/24 |

OTHER PUBLICATIONS

Xilinx Product Specification DS017 v.2.1, "*XCR3064XL 64 Macrocell CPLD*," Feb. 13, 2004.

* cited by examiner

*Primary Examiner* — Ricky Ngo
*Assistant Examiner* — Kan Yuen
(74) *Attorney, Agent, or Firm* — Ingrassia Fish & Lorenz, P.C.

(57) ABSTRACT

A telemetry system is described in which a plurality of channels are coupled to a bus. A control subsystem controls the channels so that one of the channels presents to the bus during its designated time period a channel characteristic. The control subsystem interrogates in the analog domain each of the channels during its designated time period, and forms a signal representative of the channel characteristic. The control subsystem may combine one or more of the signals into a digital packet, and transmit the same over a network.

10 Claims, 16 Drawing Sheets

LOW POWER TELEMETRY SYSTEM AND METHOD

This application claims the benefit of U.S. Provisional application 60/474,316 filed May 30, 2003, which is hereby incorporated by reference herein as though set forth in full.

FIELD OF THE INVENTION

This invention relates to the field of telemetry systems, and, more specifically, to very low power time division multiplexed analog domain telemetry systems.

RELATED ART

Conventional telemetry systems typically function in the digital domain, and consume excessive power because of the high clock rates incident to the use of digital circuitry, and the infrastructure needed to support digital domain processing. Dissipated power in such systems is ultimately dominated by this digital infrastructure and, as such, cannot be further optimized for very low power applications, such as autonomous underwater surveillance, very large scale fixed systems, multi-line towed array systems, and other multiplexed sensor systems that are required to operate in "power limited" applications.

SUMMARY

In a first aspect of this disclosure, a telemetry system is described. The system comprises a bus and a plurality of channels each coupled to the bus. A control subsystem (1) controls the channels so that each one presents to the bus, during a time period designated for the channel, a channel characteristic representative of a signal sampled by the channel, (2) interrogates in the analog domain each of the channels, during the time period designated for a channel, the characteristic presented by the channel, and (3) forms a signal representative of the characteristic presented by the channel during the designated time period.

In one embodiment, the control subsystem time division multiplexes each of the channels so that each and only one of the channels presents to the bus during the designated time period for the channel within a cycle a channel impedance proportional to a signal amplitude sampled by the channel. During the time periods in the cycle other than the time period designated for the channel, the channel presents an open circuit equivalent impedance to the bus. The control subsystem in this embodiment interrogates each of the channels by presenting to each of the channels during its designated time period an analog pulse over the bus. The channel impedance presented by the channel creates an impedance mismatch, which causes a modulated version of the pulse to be reflected back to a termination device coupled to one end of the bus. The modulation of the reflected pulse is representative of the channel impedance, and thus the amplitude of the signal sampled by the channel. The control subsystem forms a signal representative of the amplitude of the reflected pulse. In one embodiment, the control subsystem forms a packet from one or more of the signals, and then transmits the packet over a network.

Other systems, subsystems or system components, methods, features and advantages of the invention or combinations of the foregoing will be or will become apparent to one with skill in the art upon examination of the following figures and detailed description. It is intended that all such additional systems, methods, features, advantages and combinations be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

FIGS. 4A-4I comprise a circuit diagram of one implementation example of the channel of FIG. 3, wherein:

FIG. 4A illustrates an input stage to a power conditioning and control signal recovery circuit;

FIG. 4B illustrates a voltage regulation circuit;

FIG. 4C illustrates a voltage-controlled impedance circuit;

FIG. 4D illustrates an output gating circuit;

FIG. 4E illustrates a channel programming port with a plurality of programming inputs;

FIG. 4F illustrates a system synchronization acquisition circuit;

FIG. 4G illustrates a low power sample & hold circuit;

FIG. 4H illustrates a system clock acquisition circuit; and

FIG. 4I illustrates a low power channel control circuit comprising a programmable logic element and interfacing circuitry.

DETAILED DESCRIPTION

As utilized herein, terms such as "about" and "substantially" and "near" are intended to allow some leeway in mathematical exactness to account for tolerances that are acceptable in the trade. Accordingly, any deviations upward or downward from the value modified by the terms "about" or "substantially" or "near" in the range of 1% to 20% or less should be considered to be explicitly within the scope of the stated value.

The term "logic" refers to implementations in hardware, software, or combinations of hardware and software.

The term "packet" means a grouping of digital data and control elements which is switched and transmitted as a composite whole, wherein the data and control elements and possibly error control information are arranged in a specified format. The term "packet" includes a frame.

Figure 1A:
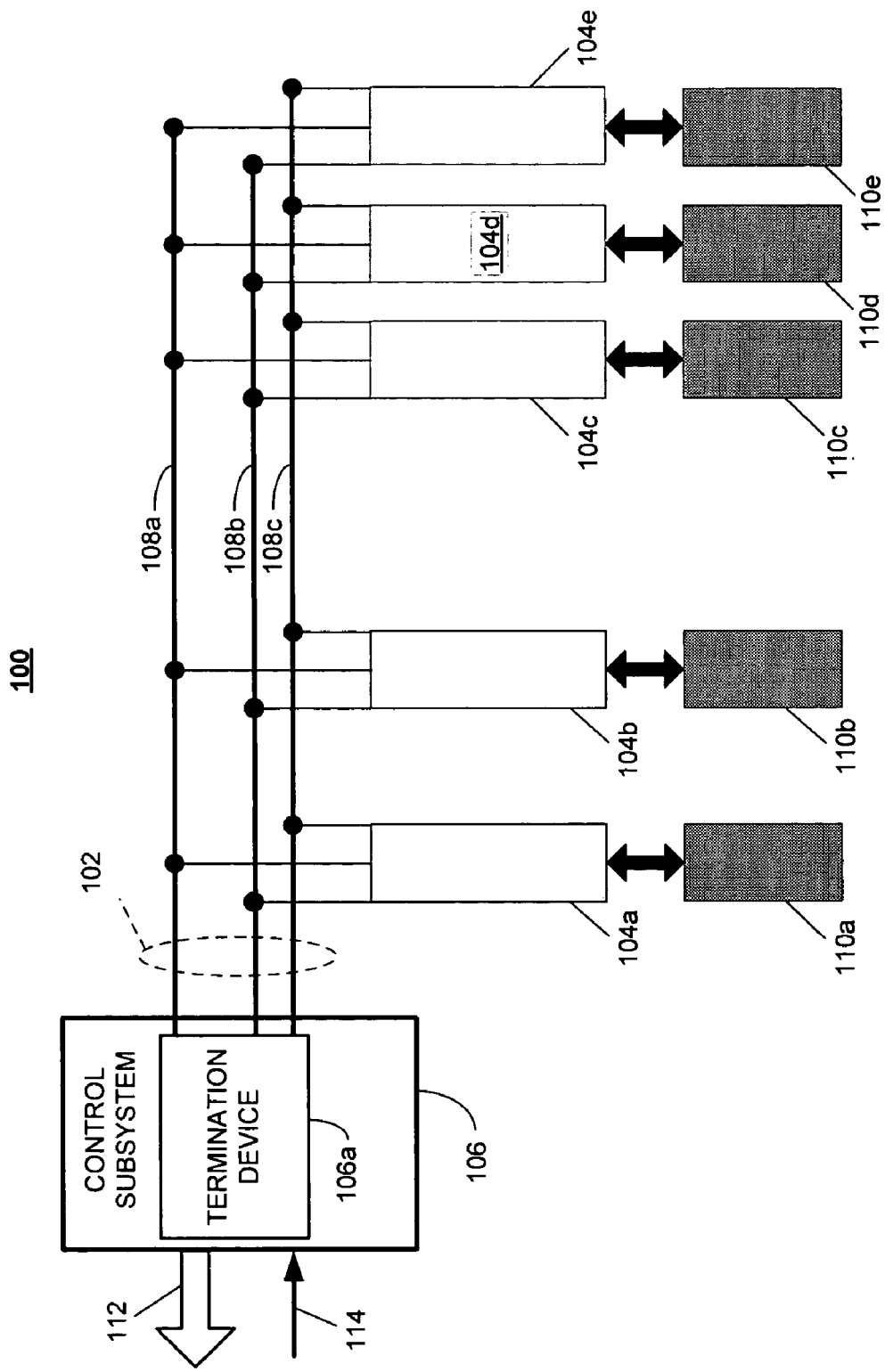
FIG. 1A is a block diagram of one embodiment of a low power telemetry system according to the invention.

FIG. 1A illustrates one embodiment of a telemetry system 100 according to the invention. The system comprises a bus 102, and a plurality of channels 104a, 104b, 104c, 104d, 104e, each coupled to the bus 102. Note that the physical limitation on the number of channels is determined by the combination of the sample rate and the round trip propagation time associated with the strobe-and-probe process. Thus, a telemetry system according to the invention is not limited to the number of channels described in this exemplary embodiment. A control subsystem 106, which includes termination device 106a, is configured to (1) control the channels 104a, 104b, 104c, 104d, 104e so that each one presents to the bus 102, during a time period within a cycle designated for the channel, a channel characteristic representative of a signal sampled by the channel, (2) interrogate, during the time period designated for a channel, the characteristic presented by the channel, and (3) form a signal representative of the characteristic presented by the channel during the designated time period.

Each of the channels is assumed to sample (or have previously sampled) a signal provided by a sensor accessible to the channel. In the embodiment of FIG. 1A, for example, channel 104a samples a signal provided by sensor 110a, channel 104b samples a signal provided by sensor 110b, channel 104c samples a signal provided by sensor 110c, channel 104d samples a signal provided by sensor 110d, and channel 104e samples a signal provided by sensor 110e. Since it is contemplated that any type of sensor may be used in the system, these sensors are not considered part of the system 100 as broadly described.

In one embodiment, the control subsystem 106 time division multiplexes the channels so that each and only one channel presents to the bus a characteristic of the channel during a time period designated for the channel within a cycle.

The channel characteristic presented by the channel during its designated time period may be any measureable parameter such as a channel voltage, current, or a channel impedance representative of the amplitude of the signal sampled by the channel. In one embodiment, where the measured parameter is an impedance, control subsystem 106 may control each of the channels to present to bus 102 an open circuit equivalent output impedance during time periods in the cycle other than the time period designated for the channel. Control subsystem 106 may synchronize the channels so that each one samples the amplitude of the output of its corresponding sensor at about the same time.

Bus 102 may comprise one or more signal lines. In the embodiment of FIG. 1A, bus 102 comprises three signal lines 108a, 108b, 108c, but it should be appreciated that examples are possible where more or less than three signal lines are included in the bus. For example, the embodiment shown in FIG. 1B includes a bus 102 having four signal lines 108a, 108b, 108c, and 108d.

Figure 1B:
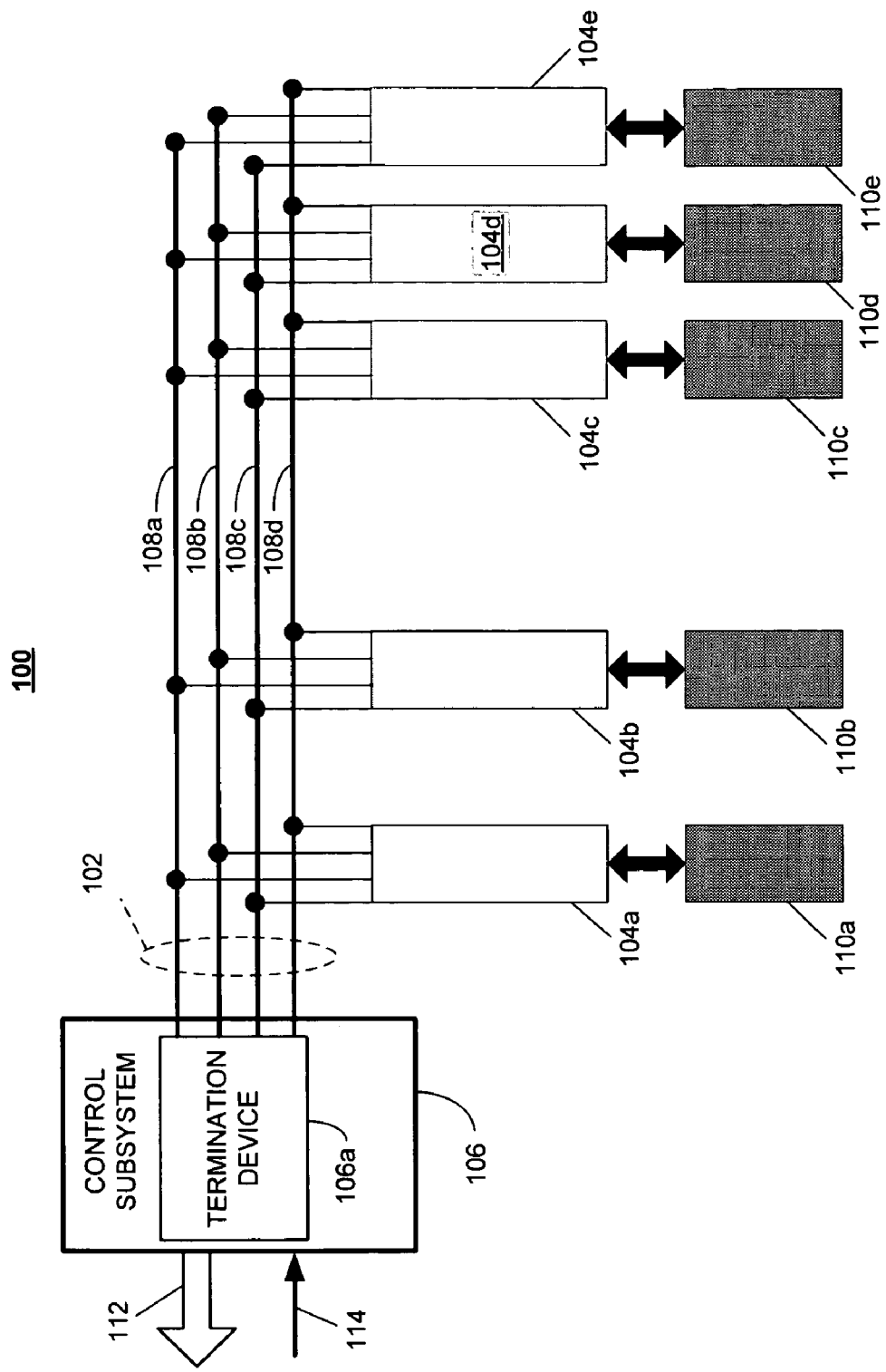
FIG. 1B is a block diagram of another embodiment of a low power telemetry system according to the invention.

Control subsystem 106 may control and provide power to each of the channels through the same one or more signal lines in the bus. In the embodiment of FIG. 1A, for example, control subsystem 106 may control and provide power to each of the channels through a differential signal transmitted over signal lines 108b and 108c which lines may be implemented, e.g. as a twisted pair or as a coaxial cable. In the embodiment of FIG. 1B, control subsystem 106 may provide power to each of the channels over any two signal lines, such as 108b and 108c, while a dedicated signal line, such as 108d, may be used exclusively to transmit control signals to the channels.

In one example, where a pair of signal lines carries a differential signal that provides power and control, the differential signal has first and second states. In the first state, the differential signal provides power to the channels. In the second state, the differential signal performs a control function at one or more of the channels. A power storage element (such as a capacitor) at each channel provides power to the channel when the differential signal is in the second state.

A control subsystem 106 may comprise a termination device 106a at one end of bus 102, and a distributed control element (not shown) at each of the channels. The distributed control element in a channel may identify the time period designated for the channel within a cycle.

In one example, the termination device clocks each of the distributed control elements through a clocking signal sent over bus 102. In this example, each of the distributed control elements includes a timing element (such as a counter) which is updated responsive to the clocking signal. The distributed control element may then identify the time period designated for the channel based on a comparison of the contents of the timing element with a predetermined value for the channel.

The distributed control elements may be programmable with the predetermined value for the channel. In one example, each of the distributed control elements is remotely programmable with the predetermined value for the channel.

In one implementation, the distributed control element for one or more of the channels is implemented as a field programmable gate array (FPGA). Alternatively or in addition, the distributed control element for or more of the channels is implemented as a complex programmable logic device (CPLD). In one example, the CPLD is a CMOS CPLD. The CMOS CPLD may have a power consumption which varies directly with its clocking rate. In one example, the CMOS CPLD has about a zero power consumption at about a zero clocking rate.

In one embodiment, each channel includes a voltage controlled impedance circuit for presenting to bus 102 during the designated time period for the channel an impedance representative of the signal amplitude sampled by the channel. Control subsystem 106 may control this circuit so that an open circuit equivalent output impedance is presented to bus 102 during time periods in the cycle other than the time period designated for the channel.

The impedance presented by a channel to bus 102 during the designated time period may give rise to an impedance mismatch condition at the channel. Control subsystem 106 may interrogate a channel during its designated time period by transmitting from termination device 106a an analog pulse over bus 102. The impedance mismatch at the channel may cause at least a partial reflection of the pulse to return to termination device 106a, with the amplitude of the reflected pulse being representative of the impedance presented by the channel.

Control subsystem 106 may perform at least partial equalization of the transmitted pulses to compensate for variable attenuation caused by different distances between termination device 106a and each of the channels. In the embodiment of FIG. 1A, for example, the interrogation pulse sent to channel 104e may experience greater attenuation than that sent to channel 104a since the distance between the termination device 106A and the channel 104e exceeds that for channel 104a. This is particularly true for configurations having very long cable arrays, for example, 1000 m or more. Accordingly, control subsystem 106 may perform equalization on the two pulses used to interrogate these channels so that the pulses will have about the same amplitude at the time they are received at their respective channels.

Control subsystem 106 may also comprise a linearization circuit to correct any nonlinearities introduced in the reflected signal by the voltage controlled impedance circuit. In one embodiment, these nonlinearities may be corrected by post-linearization of the reflected signal using a processor (not shown) in control subsystem 106. For example, a digital value of a reflected signal may be read by means of the processor, and mapped into a lookup table to retrieve a corrected value.

Termination device 106a may be configured to combine the signals representative of the characteristic presented by one or more of the channels into a packet, and then transmit the packet over a network. In the embodiments illustrated in FIGS. 1A and 1B, for example, the packet may be transmitted to the network over one or more egress lines 112, which may be wireline or wireless links. In one example, the one or more egress lines 112 are wireline modem connections. Termination device 106a may also comprise a trunk interface or a network interface. In one example, the termination device is a backbone network interface. In another example, it comprises an ethernet interface. In a third example, it comprises an Internet interface.

Termination device 106a may be configured to process the one or more signals using a procedure which may be programmed into termination device 106a. In one example, the procedure is remotely programmed into termination device 106a. In the embodiments illustrated in FIGS. 1A or 1B, for example, the procedure may be programmed into termination device 106a over one or more ingress lines 114, which again may be wireline or wireless links. In one example, the one or more ingress lines 114 are wireline modem connections. These one or more ingress lines 114 may also provide a mechanism for remotely programming the control element in the termination device to allow dynamic selection of preprogrammed sensor modes. These specific channel selection or sample rate modes are contained in the distributed control elements located at each of the channels. These mode values may be provided to the ingress lines 114, and then routed over bus 102 to the individual distributed control elements.

The procedure may comprise a transformation (such as a Fourier transform) applied to one or more of the signals. The procedure may also comprise a feature extraction procedure. In one example, the procedure combines one or more of the signals into a beam. The procedure may also comprise a search procedure. In one example, the procedure comprises a predetermined mode of operation, such as a test mode, or another mode that continuously samples a selected channel while the other channels remain unsampled. In another example, the procedure comprises a schedule for interrogating more than one of the channels, or all of the channels. A skilled artisan will appreciate that many different modes and sequences may be realized by programming a sampling procedure into a termination device 106a.

Figure 2:
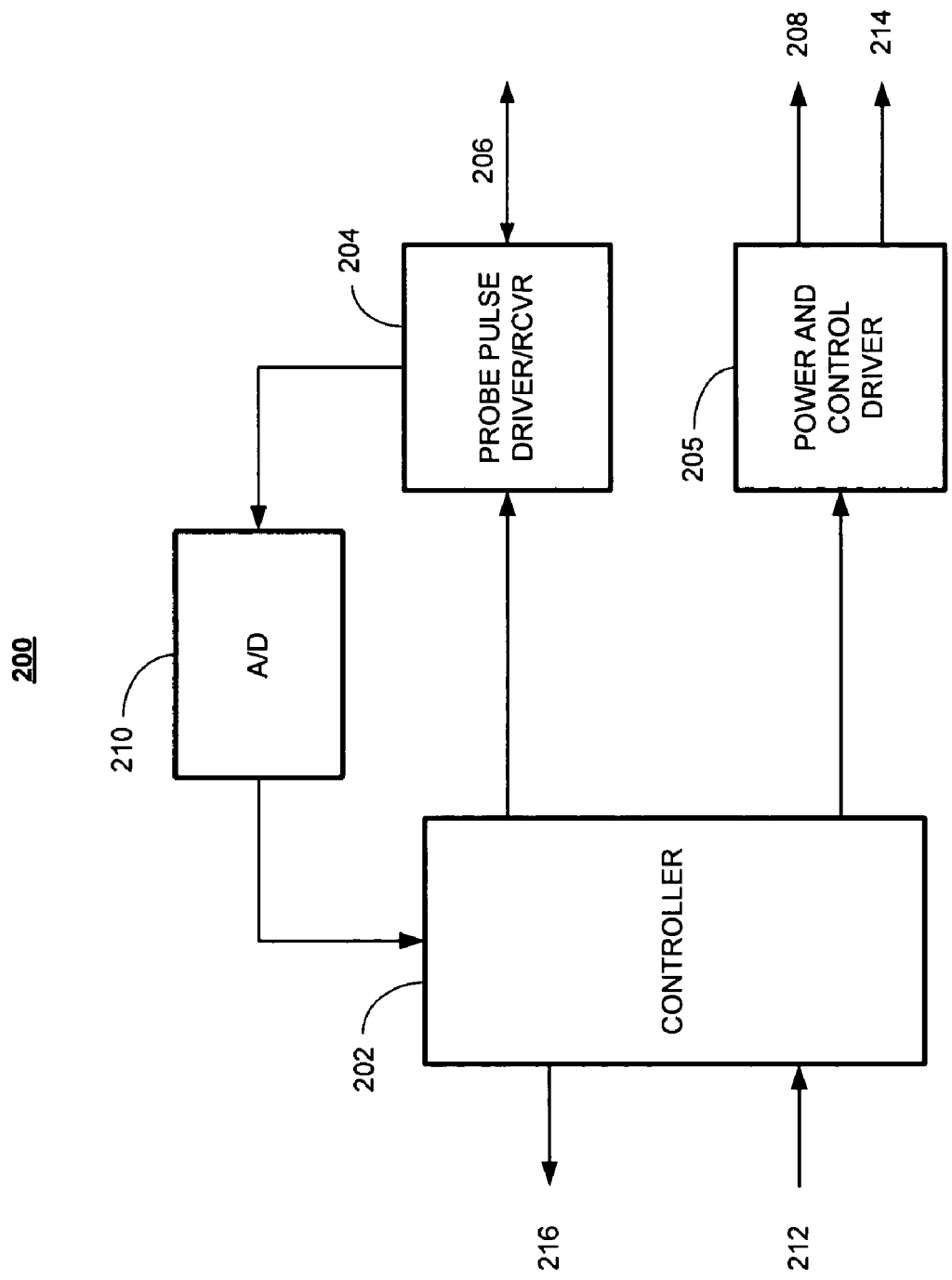
FIG. 2 is a block diagram of one embodiment of a termination device in the system of FIGS. 1A or 1B.

FIG. 2 is a block diagram illustrating one embodiment 200 of the termination element. In this embodiment, the termination element comprises a controller 202 coupled to a probe pulse driver/receiver 204 and a power & control driver 205. One or more bidirectional pulse probe signal lines 206 extend from the probe pulse driver/receiver 204. One or more unidirectional differential power & control signal lines 208 extend from the power & control driver 205. In addition, one or more unidirectional programming lines 214, such as JTAG compliant programming lines, extend from the power & control driver 205.

The receiver side of the probe pulse driver/receiver 204 is coupled to A/D converter 210. The output of the A/D converter 210 is coupled to the controller 202. One or more JTAG compliant programming lines 212 form an input to the controller 202. In addition, one or more signal lines 216 for outputting digital packet information forms an output of the controller 202.

The one or more pulse probe signal lines 206, and the one or more power & control signal lines 208 together comprise one embodiment of the bus 102 previously described in relation to system 100.

The controller 202, through suitable signals sent and received by the probe pulse driver/receiver 204 over the one or more signal lines 206, interrogates the channels in the analog domain. Similarly, the controller 202, through suitable signals sent by the power & control driver 205 over the one or more signal lines 208, provides power to and controls the one or more channels in the previously described manner. In addition, the controller 202, through the one or more signal lines 214, programs the distributed control elements in each of the channels in the previously described manner.

The signals received from the channels during the interrogation process are routed to the A/D converter 210, which converts them to digital values. The controller 202 combines one or more of the digital values into a packet, and routes the packets to a network over one or more signal lines 216.

In one implementation example, controller 202 may comprise a single chip 8051 type microcontroller, probe pulse driver/receiver 204 may comprise a series of low resistance CMOS switches to form a differential line driver, power and control driver 205 may be implemented via a single pole double throw CMOS switch that toggles between the two states of the control circuit, and A/D circuit 210 may comprise an Analog Devices AD7677 A/D converter selected for its low power and high speed. In this example, controller 202 clocks the system at about 25-50 kHz, which is much lower than the MHz clock rate typically used to clock digital systems. The combination of the lowered clock rate, the time division multiplexing of the channels, the analog domain probing of the channels (which avoids the need to clock the data out at a high rate), and the use of a zero power CPLD (to be discussed), enables the telemetry segment of a subsystem deploying this technique to achieve a reduced power consumption compared to digital systems in the 5 milliwatt per channel range.

Figure 3:
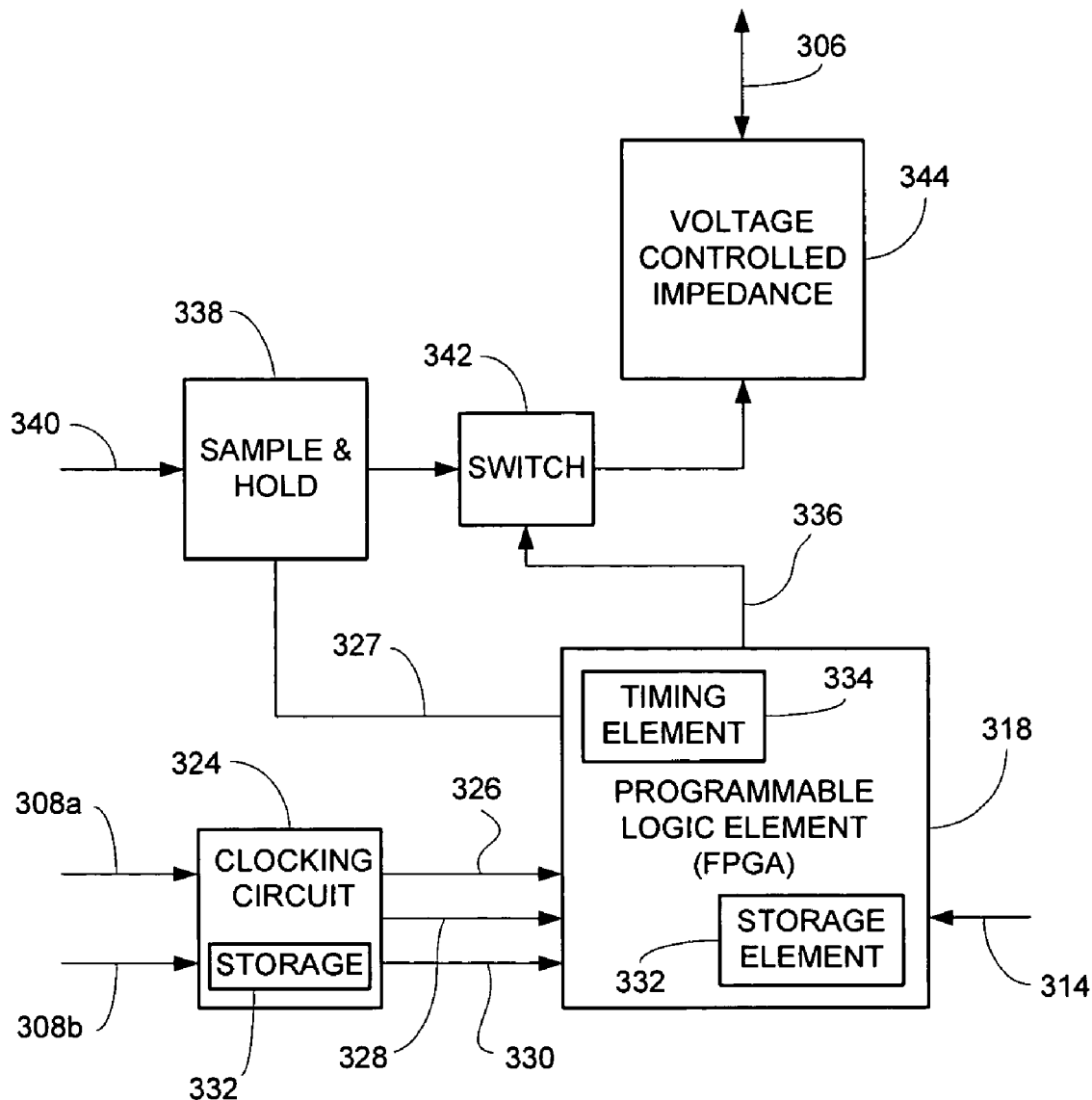
FIG. 3 is a block diagram of one embodiment of a channel in the system of FIGS. 1A or 1B.

FIG. 3 is a block diagram of one embodiment of a channel 300 according to the invention. In this embodiment, it is assumed that the one or more probe pulse signal lines 206 form a twisted pair for the transmission and reception of a differential mode probe pulse 306. It is also assumed that the one or more power & control signal lines 208 likewise form a twisted pair for the transmission of a differential mode power & control signal 308.

In this embodiment, channel 300 comprises a programmable logic element 318, such as a field-programmable gate array (FPGA). FPGA 318 in turn comprises a timing element 320 and a storage element 322 for holding a unique channel value in memory which may be remotely programmed into channel 300.

A clocking circuit 324 receives differential power & control signal 308, and, in response, forms separate sync, strobe and power signals 326, 328, and 330, provided over separate sync, strobe, and power signal lines, respectively. A power storage element 332 is also provided as part of the clocking circuit 324. When differential power & control signal 308 is in a first state, it provides power to FPGA 318 over signal line 330. It also provides power to storage element 332 which stores the power. When differential power & control signal 308 is in a second state, it provides either sync signal 326 or strobe signal 328 to FPGA 318 over, respectively, the sync and strobe signal lines. During this time, power storage element 332 provides power to FPGA 318, and also to support circuitry within the telemetry electronics of channel 300.

The FPGA 318 includes a storage element 332 which holds a unique channel value previously programmed into FPGA 318 over one or more JTAG compliant signal lines 314. In addition, FPGA 318 includes a timing element 334, which, in response to strobe signal 328, either counts up or down depending on the specific implementation. The contents of timing element 334 are compared with the channel value held by storage element 332. When the two are equal, FPGA 318 asserts a signal on signal line 336. Otherwise, signal line 336 remains unasserted.

A sample & hold circuit 338 is also provided. This circuit receives a sensor input 340. When sync signal 326 is asserted, FPGA 318, responsive to signal 326, sends a control signal 327 to sample & hold circuit 338. Upon receiving control signal 327, sample & hold circuit 338 samples the amplitude of sensor input 340, and then holds the sampled value. This functional element allows the sensor output to be captured during a system quiet period (the bus power is off during this sampling period) as well as allows simultaneous capture of sensors where skew in samples will violate the processing requirements.

When signal 336 is asserted, a switch 342 is activated, allowing the sampled value held by sample & hold circuit 338 to be received by a voltage controller impedance circuit 344. In response, voltage controller resistor circuit 344 presents an impedance to the twisted pair carrying signal pulse 306 which is representative of the sampled amplitude held by the sample & hold circuit 338.

When signal 336 is not asserted, voltage controlled resistor circuit 344 presents an open circuit equivalent impedance to the twisted pair carrying pulse 306. In addition, switch 342 is opened, thus decoupling sample & hold circuit 338 from voltage controller resistor circuit 344.

When a differential probe pulse 306 is received over the twisted pair, if the voltage controlled impedance circuit 344 is presenting an open circuit equivalent impedance to the twisted pair, pulse 306 terminates in the channel, and is not reflected. The decoupling provided by switch 342 also helps eliminate the introduction of noise and channel cross-talk into the telemetry electronics of channel 300.

However, when a differential probe pulse 306 is received over the twisted pair, and voltage controlled resistor circuit 344 is presenting an impedance to the twisted pair that is representative of the sampled amplitude held by the sample & hold circuit 338, an impedance mismatch is created at the channel. Accordingly, an amplitude-modulated version of probe pulse 306 is reflected back over the twisted pair, with the degree of amplitude modulation representing the impedance presented by the channel (and hence the sampled amplitude held by sample & hold circuit 338). The reflected pulse is thus sent back to termination device 200.

FIGS. 4A through 4I illustrate one implementation example of a channel according to the invention. These figures make up a single circuit diagram for electronics that comprise a channel such as channel 300 shown in FIG. 3. Interconnections between figures are represented by an upper case letter within a circle; for example, the encircled "A" in the upper right corner of FIG. 4A defines a direct electrical connection to the encircled "A" in the lower right corner of FIG. 4I. Typical values for various electronic components comprising the circuit are as shown in the figures. However, these values are exemplary only, and should not be thought of in any limiting sense. Skilled artisans will recognize that many other component values and/or combinations of components may be used to achieve the same or similar results.

Figure 4A:
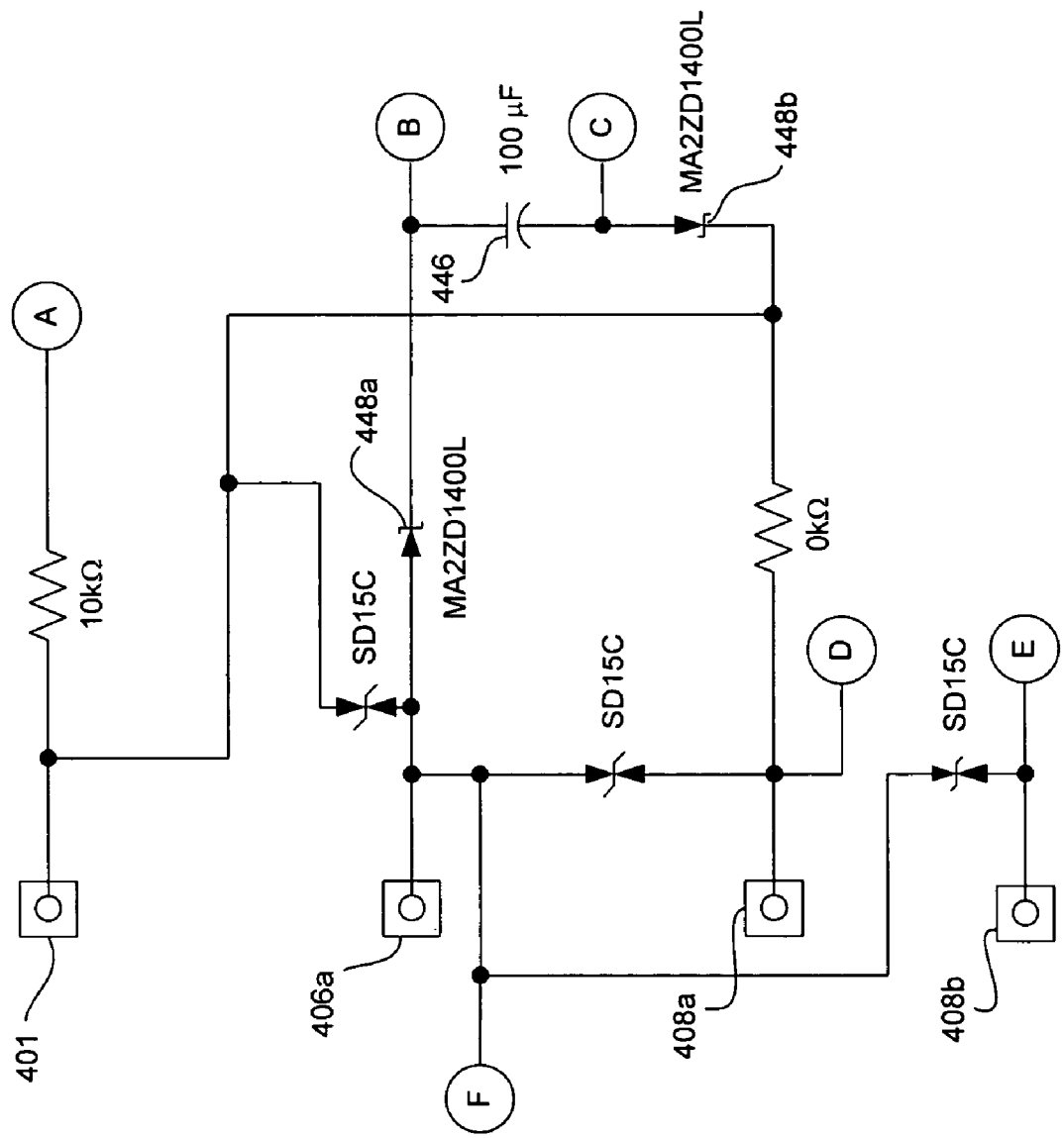
Figure 4B:
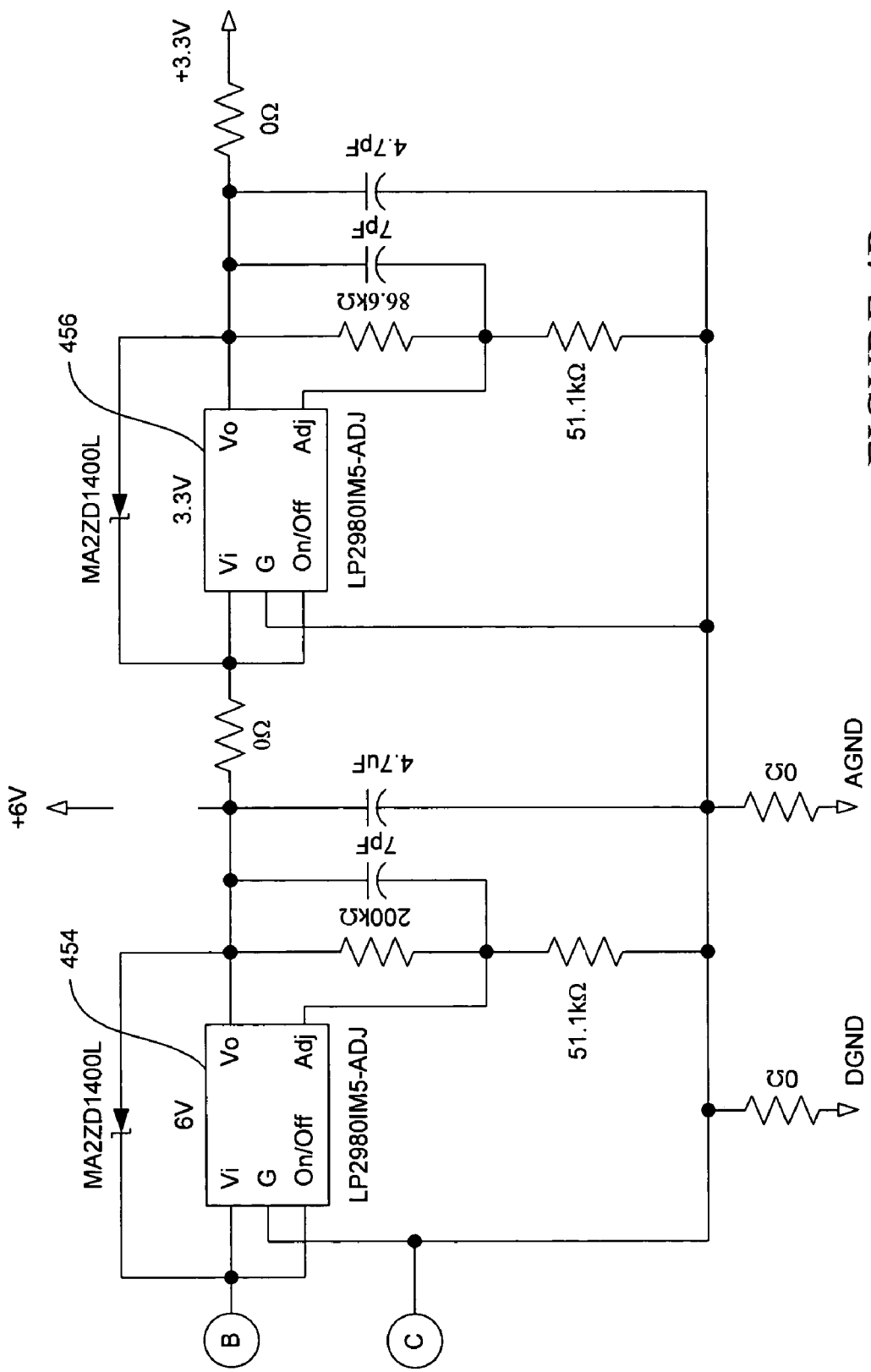
Figure 4C:
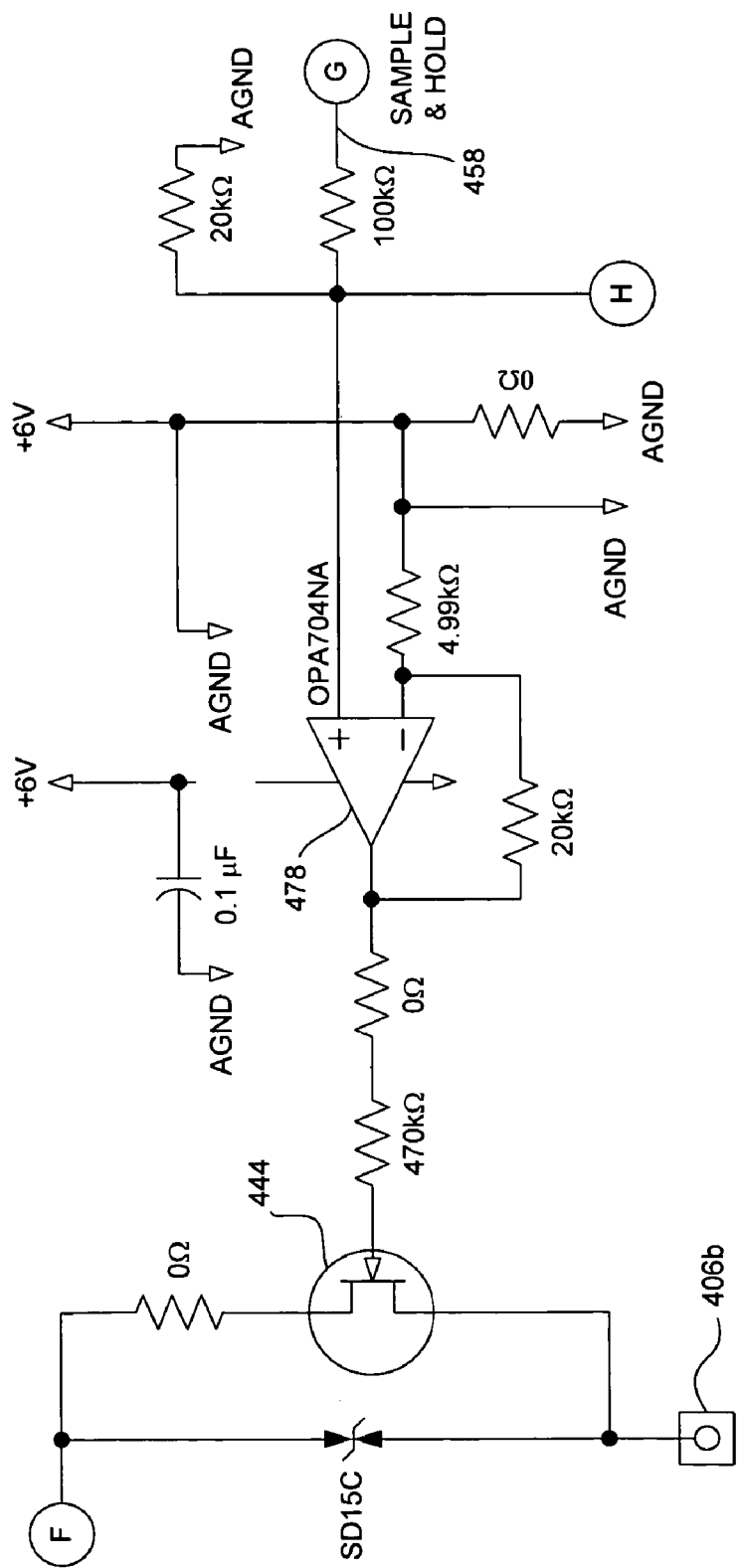

FIG. 4A shows the input stage to the power & control input conditioning circuit that is represented by block 324 in FIG. 3. A signal received over input line 401 sets one of a plurality of programming modes. Input line 406a functions as a system ground. Input line 406b, shown on the voltage controlled impedance circuit of FIG. 4C, provides a source for an interrogation pulse, corresponding to input 306. Input line 408a provides a "sync" input, which is a combination of power and signaling corresponding to input 308a of FIG. 3. Input line 408b provides a "strobe" input corresponding to input 308b. Signals 408a and 408b may originate from a power & control driver circuit such as block 205 shown in FIG. 2. Power regulation for the power & control input conditioning circuit is provided by 6V regulator 454 and 3.3 V regulator 456, shown in FIG. 4B. Regulators 454 and 456 may be conventional voltage regulators, for example, National Semiconductor adjustable type LP2980 or other low dropout equivalent. Additional configurations of this power circuit may eliminate the need for the 6 volt supply in as much as the true telemetry system is able to run strictly on a 3.3 volt supply.

Signal lines 406a, 406b, 408a and 408b may form a twisted quad in this particular example, with signal lines 406a and 406b forming a twisted pair within this quad, and with signal lines 408a and 408b forming a second twisted pair within this quad. Implementations utilizing differential mode signals transmitted over twisted pairs enable extended length busses, i.e., up to 500 meters or more, as well as enhanced reliability and low cost compared to single-ended or coax implementations.

Probe pulse signal lines 406a and 406b deliver a differential mode probe pulse to the channel, as well as return a modulated differential mode reflected probe pulse to the termination end. Power & control signal lines 408a and 408b deliver a differential mode power & control signal which has one of two states. In the first state, it provides power to the channel, and also power to charge capacitor 446. In the second state, it provides either a sync or strobe signal to the channel, and capacitor 446 provides power to the channel. Diodes 448a and 448b prevent leakage from capacitor 446 when it is providing power to the channel. Thus, capacitor 446, in combination with diodes 448a and 448b, functions as an uninterruptible power supply, preventing any power perturbations in the system when signal lines 408a and 408b are in the second state. In this example embodiment, diodes 448a and 448b may be Panasonic type MA2 ZD1400 L or equivalent.

Figure 4D:
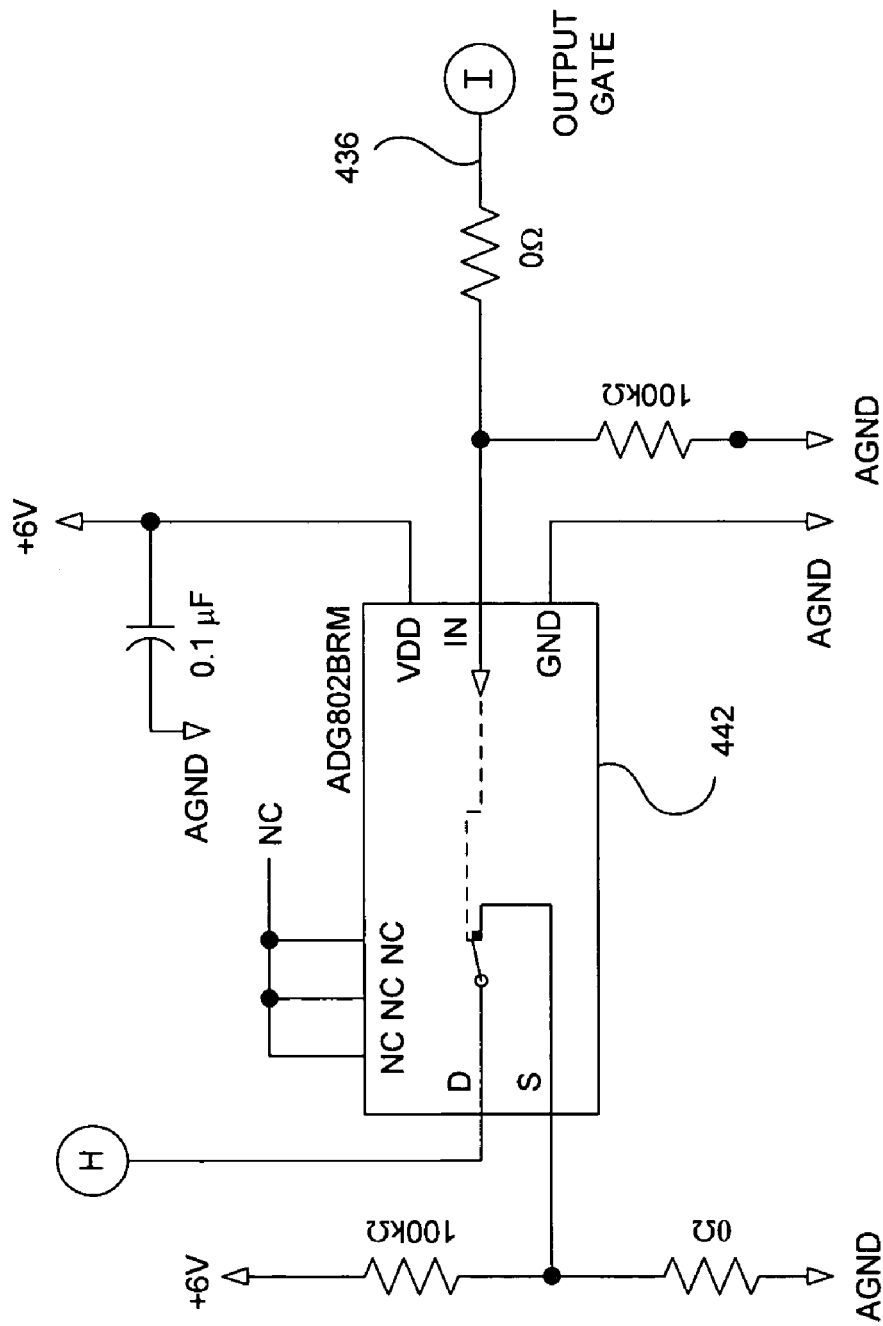
Figure 4E:
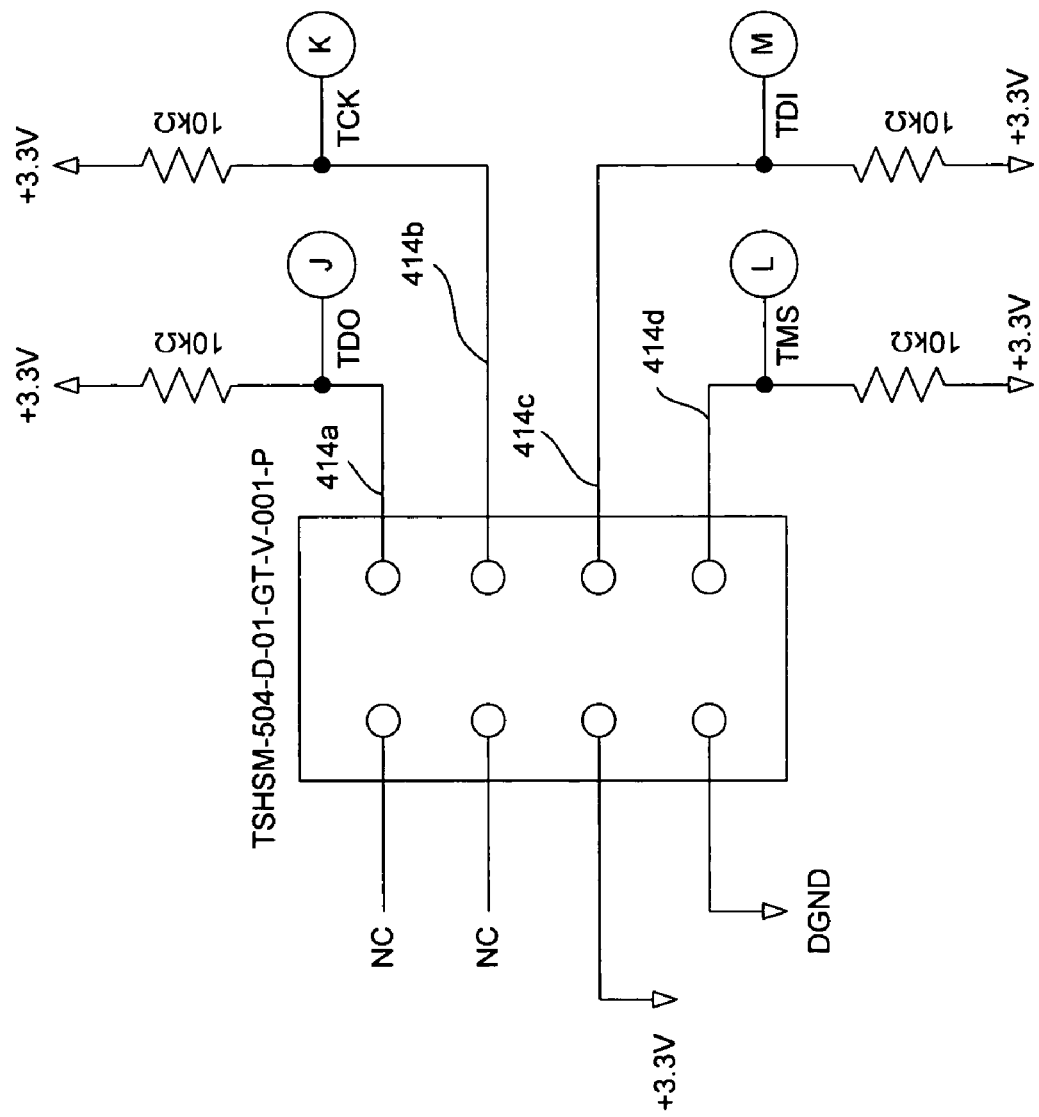
Figure 4F:
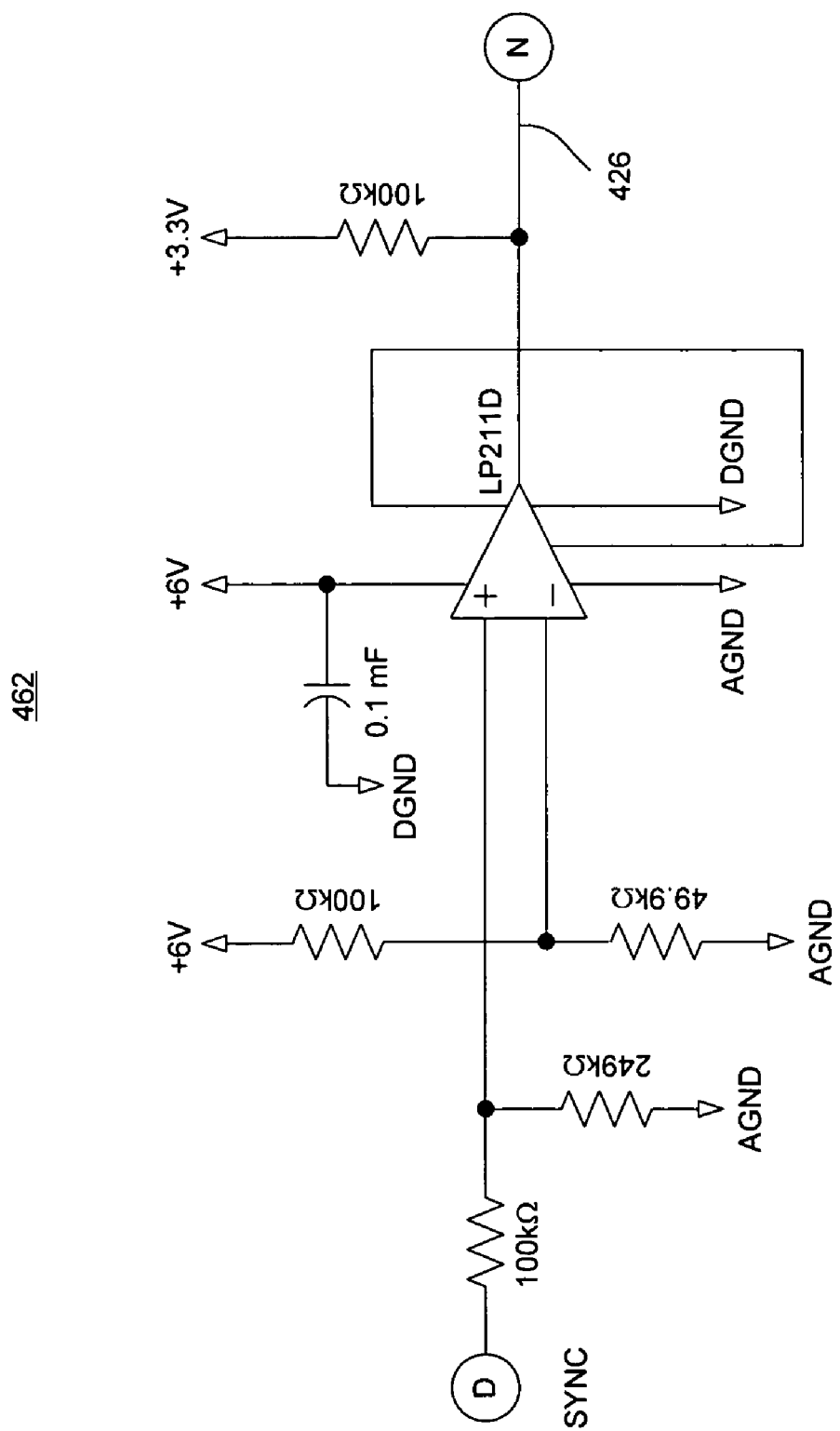

The input on signal line 408a (sync) and the input on signal line 408b (strobe) are each fed to a comparator circuit to determine if a sync or strobe signal is being received over these signal lines. FIG. 4F shows the sync input to a system synchronization acquisition circuit 462. FIG. 4H shows the strobe input to a system clock acquisition circuit 463. The strobe input corresponds to the optional fourth signal line 108d shown in the alternative embodiment of FIG. 1B, and also to input 308b shown in FIG. 3.

Figure 4G:
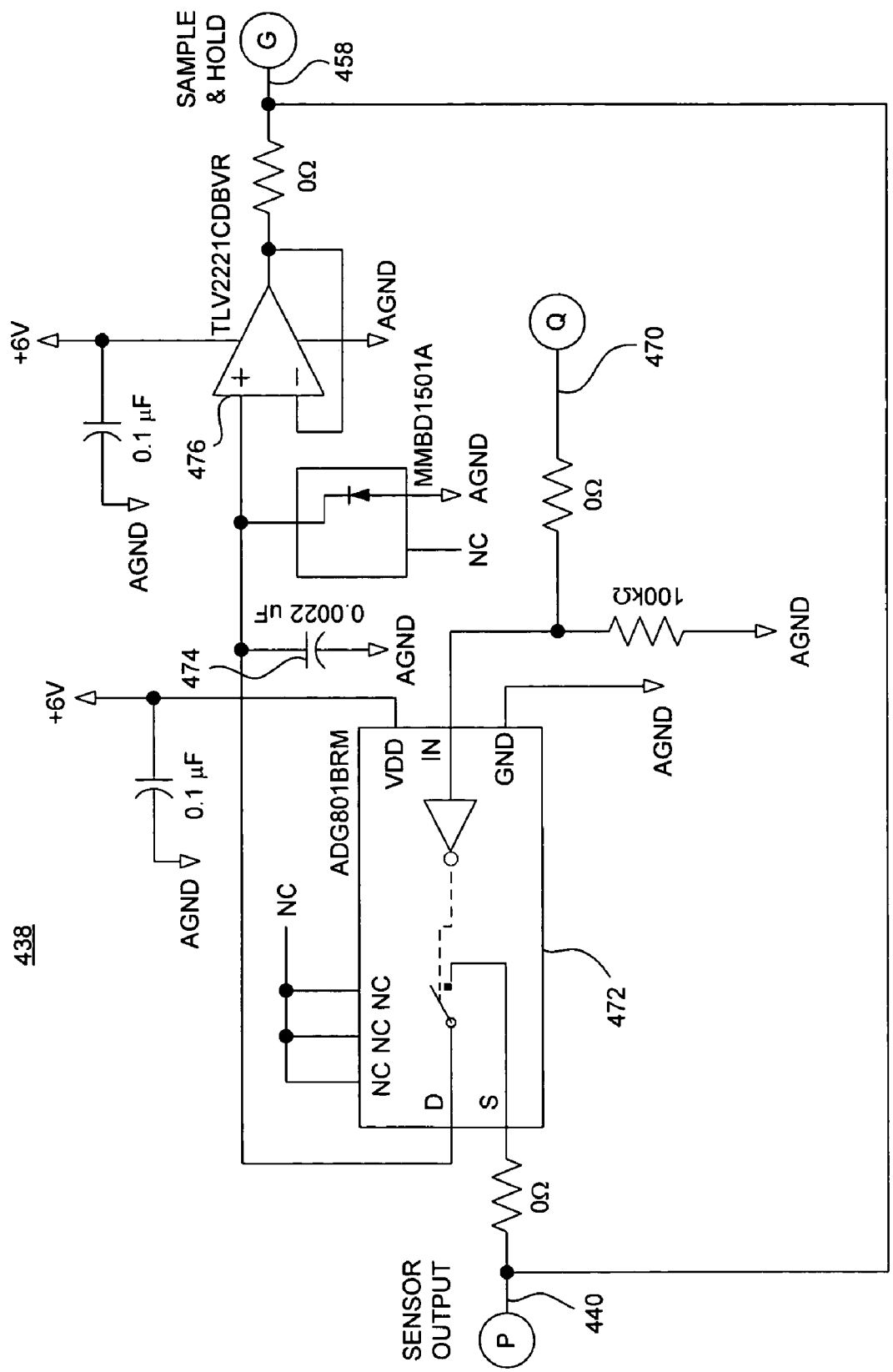
Figure 4H:
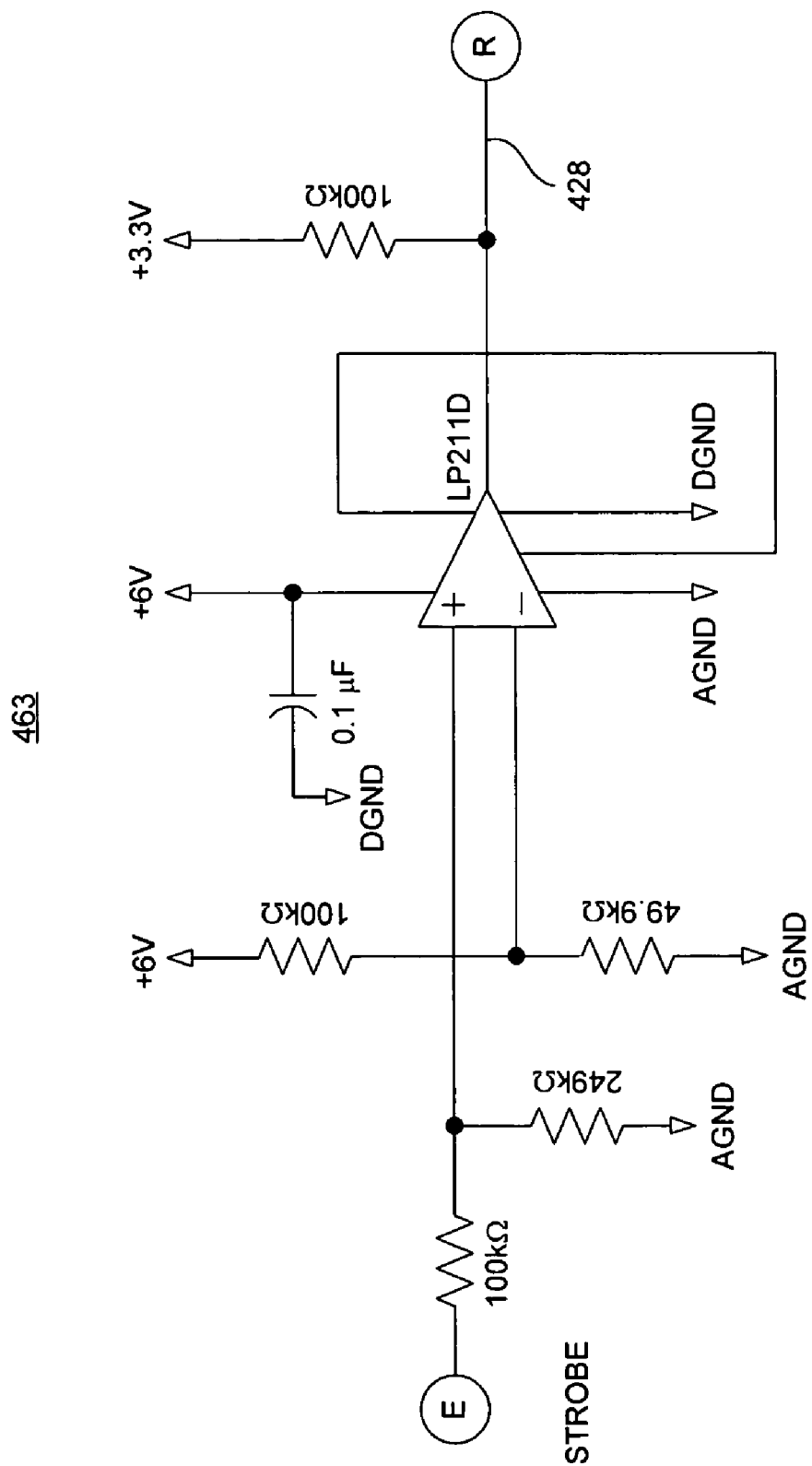
Figure 4I:
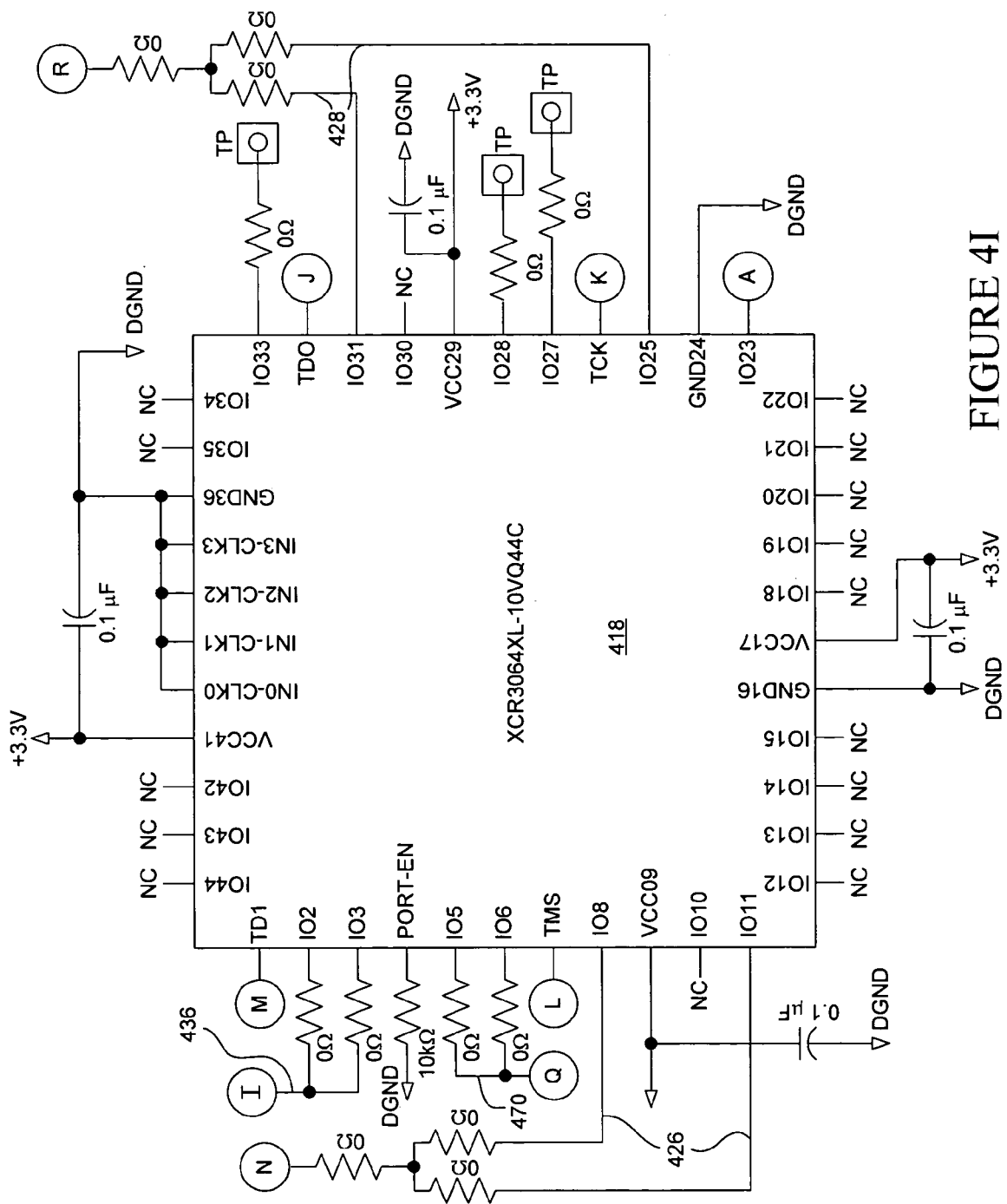

When comparator 462 receives a sync input, comparator 462 outputs a logic signal 426 which provides a reset, or synchronization signal to FPGA 418 on the low power channel control circuit of FIG. 4I. Similarly, when comparator 463 receives a strobe input, comparator 463 outputs a logic signal 428 which provides a strobe signal to FPGA 418. In one embodiment, sync signal 426 and/or strobe signal 428 may be provided to FPGA 418 via redundant input lines for enhanced reliability. FPGA 418 may comprise any suitable programmable logic device, such as a XILINX type XCR3064XL-10VQ44 C.

If comparator 463 outputs a strobe signal 428, strobe signal 428 increments a timing element, or counter, maintained by FPGA 418. If comparator 462 outputs a sync signal 426, it clears the counter maintained by FPGA 418. A value unique to the channel is pre-programmed into FPGA 418 through programming signal lines 414a, 414b, 414c, and 414d, shown on the channel programming port of FIG. 4E. In this embodiment, signal lines 414a, 414b, 414c, and 414d correspond to JTAG compliant ports TDO, TCK, TDI, and TMS, respectively, for FPGA 418. Within FPGA 418, a storage element comprising, for example, EEPROMs, holds this unique value in memory. This value indicates the time period within a cycle that the channel should be active, i.e., presenting an impedance to the probe pulse signal lines which represents a sampled amplitude held by sample & hold circuit 438. When the contents of the counter equals the unique channel value, output gate signal 436 is asserted. Otherwise, signal 436 remains unasserted.

Refer now to the low power sample & hold circuit of FIG. 4G. When FPGA 418 receives a sync signal 426, it sends out a sample & hold control signal 470 to a high-impedance switch 472 in sample & hold circuit 438. As long as sync signal 426 is asserted, switch 472 closes, allowing sample & hold circuit 438 to hold a sensor input signal P by storing a voltage in capacitor 474. Sample & hold circuit 438 holds this value until the next assertion of the control signal 426. Until then, the circuit 438 outputs, through op amp 476, a signal representative of its held value that is proportional to the sampled value of sensor output 440. Switch 472 may comprise an Analog Devices ADG801 BRM low voltage CMOS switch, or equivalent. Op amp 476 may be any suitable device, such as a Texas Instruments type TLV2221 CDBVR, or equivalent.

In an alternative embodiment, sample & hold circuit 438 may be configured with a means for shorting sensor output 440 to the output of op amp 476, for example, by installing zero-ohm resistors, as shown. Bypassing sample & hold circuit 438 allows further reduction in system power consumption where skewing effects are not critical. In such a case, the channel will acquire whatever sensor output 440 exists at the time a sync signal 426 is asserted.

When FPGA 418 receives a sync signal from the termination device, it asserts sample & hold control signal 426. The assertion of sample & hold control signal 426 causes the sample & hold circuit 438 to sample the amplitude of the signal present on input line 440, and store the same in capacitor 474. Sample & hold circuit 438 holds this value until the next assertion of the control signal 426. Until then, the circuit 438 outputs a signal representative of its held value on signal line 468.

Refer now to FIGS. 4C and 4D. Element 444 comprises a FET which functions in this particular example to provide the voltage controlled impedance for the channel. FPGA 418 controls whether FET 444 is turned on, thereby outputting an impedance representative of a sensor output level, or whether FET 444 is turned off, thereby outputting a high impedance. When output gate signal 436 is asserted, indicating that the designated time period for the channel is not present, switch 442 couples output gate 436 to the non-inverting input of op amp 478, effectively shorting the input to op amp 478 and turning FET 444 off, i.e. causing FET 444 to present an open circuit impedance across its output. When output gate signal 436 is not asserted, indicating that the designated time period for the channel is present, the sample & hold output signal 458 drives the non-inverting input to op amp 478, allowing op amp 478 to display a voltage level representing the amplitude of a signal previously sampled from sensor output 440. This voltage becomes a bias voltage at the gate of the FET 444, turning FET 444 on and thereby presenting an impedance at the output of FET 444.. FET 444 operates in a linear range such that the output of the FET, which is coupled to probe pulse signal lines 406a and 406b, presents to these signal lines an impedance which is representative of the sensor output 440. In one exemplary embodiment, FET 444 may comprise a type VCR2 N or equivalent. In another embodiment, op amp 478 may comprise a Texas Instruments OPA704NA type device, or equivalent.

In one aspect of the invention, the output of FET 444 presents a resistance across probe pulse signal lines 406a and 406b representative of a sensor output 440. The value of this resistance presents an impedance mismatch across 406a and 406b, causing a reflected signal to occur whenever lines 406a and 406b transmit an interrogation pulse. The amplitude of that reflection is proportional to the resistance, thus, the reflected interrogation pulse comprises a signal modulated in proportional to sensor output 440.

Referring again to FIG. 4G, sensor output 440, which is the input to sample & hold circuit 438, comprises an output signal of a sensor corresponding to any of sensors 110 through 110e as shown in FIG. 1. Any sensor, or sensor/transducer combination, may be used including but not limited to an acoustic sensor such as a hydrophone, or a magnetic, electromagnetic, or Hall effect sensor, or any other sensor or sensor/transducer that is capable of measuring a physical parameter and providing an output signal representative of the measured parameter, such as devices that measure flow, temperature, pressure, voltage, current, light, radiation, velocity, acceleration, etc. In one application, the sensor is part of a sensor array configured for underwater surveillance.

In one embodiment, sensor output 440 comprises the output of a signal conditioning circuit that provides a proper interface to sample & hold circuit 438. For example, a signal conditioning circuit may provide any of various signal processing functions well known in the art such as pre-amplification, anti-alias filtering, etc. and may also provide a desired signal-to-noise ratio through lowpass filtering techniques, etc., for a signal comprising sensor output 440. Proper conditioning may also require sensor output 440 to be scaled to within a desired voltage signal range compatible with the operational characteristics of the telemetry system.

Figure 5:
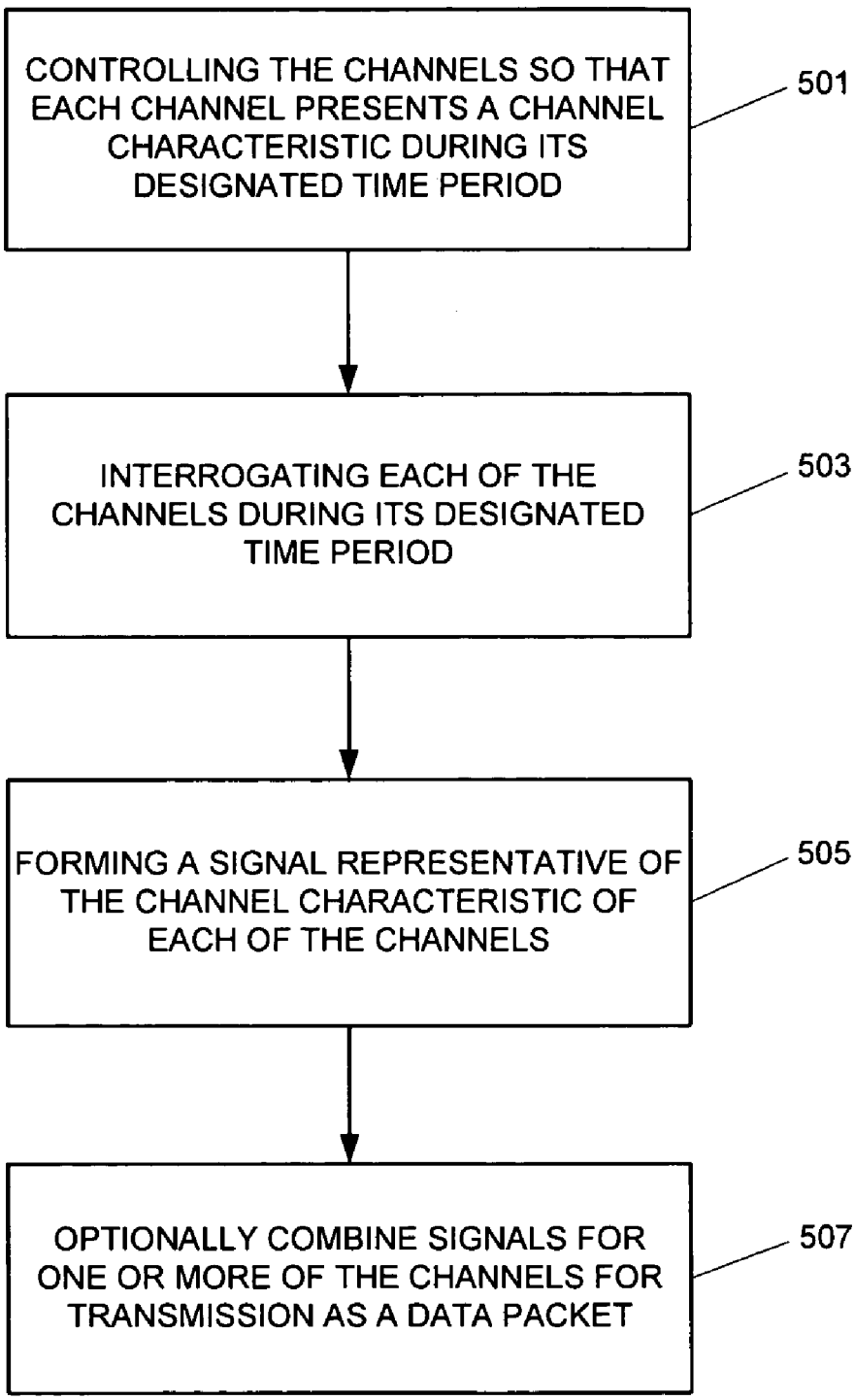
FIG. 5 is a flowchart of one embodiment of a method of telemetering one or more channels coupled to a bus.

FIG. 5 is a flowchart illustrating one embodiment of a method 500 of telemetering one or more channels coupled to a bus. Step 501 comprises controlling the channels so that each channel presents a channel characteristic to the bus during a designated time period for the channel. The next step 503 comprises interrogating in the analog domain each of the channels during its designated time period. The next step 505 comprises forming a signal representative of the characteristic presented by the channel during its designated time period. Optional step 507 comprises combining the signals from one or more of the channels to form a packet, and then transmitting or outputting the packet. From optional step 507, the method branches back to step 501 for another cycle.

Figure 6:
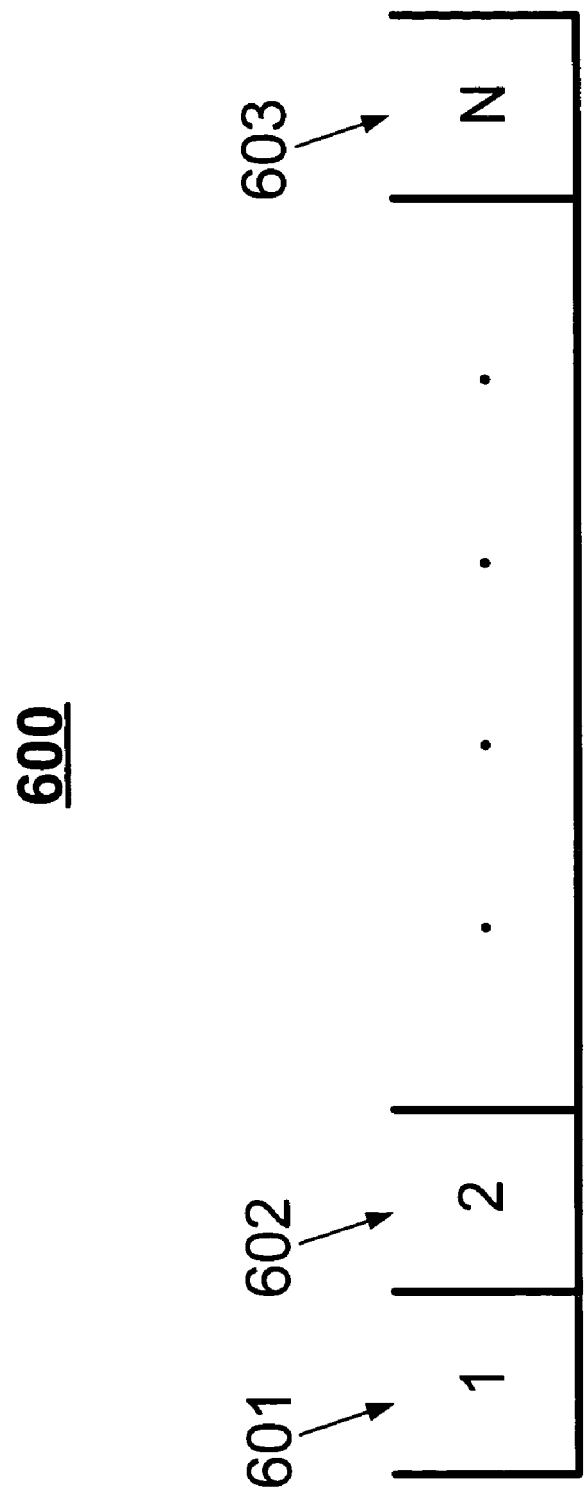
FIG. 6 is a diagram illustrating one example of the time periods within a cycle.

Step 501 may comprise time division multiplexing the channels onto the bus so that each and only one channel presents a channel characteristic to the bus during a time period designated for the channel. FIG. 6 illustrates a typical cycle 600 divided up into N time slots, one for each of the channels in a telemetry system. Time slot 601 is designated for channel 1, time slot 602 is designated for channel 2, and time slot 603 is designated for channel N. During time slot 601, channel 1 alone presents its characteristic to the bus. During time slot 602, channel 2 alone presents its characteristic to the bus. During time slot 603, channel N alone presents its characteristic to the bus. The bus may have one or more signal lines, and method 500 may further comprise controlling and providing power to each of the channels through the same one or more signal lines of the bus. In the case in which the channel characteristic presented by the channel is a channel impedance representative of the amplitude of a signal sampled by the channel, assuming time division multiplexing is in effect, each channel presents its impedance to the bus during its designated time period. However, at all other time periods in the cycle, each channel presents an open circuit equivalent impedance to the bus. Thus, in FIG. 6, during time period 601, channel 1 presents its impedance to the bus, and all the other channels present an open circuit equivalent impedance to the bus. During time period 602, channel 2 presents its impedance to the bus, and all the other channels present an open circuit impedance to the bus. During time period 603, channel N presents its impedance to the bus, and all the other channels present an open circuit impedance to the bus.

The method 500 in FIG. 5 may further comprise synchronizing the channels so that each one samples the amplitude of a signal at about the same time. This helps prevent clock skew and unwanted phase differences between channels in coherently processed high frequency applications. In one example, this synchronization is provided by a sync signal provided at the inception of a cycle. The sync signal causes a sample & hold circuit at each of the channels to perform a sample & hold function at about the same time. This sync signal may perform other synchronization functions, such as resetting counters maintained at each of the channels for purposes of locating the designated time period for the channel.

Method 500 may also comprise controlling and providing power to each of the channels through a differential signal transmitted over the same one or more signal lines. This differential signal may have first and second states, and the differential signal may provide power to the channel in the first state and perform a control function at the channel in the second state. While the differential signal is in the second state, a power storage element at the channel may be switched in to provide power to the channel.

Method 500 may further comprise identifying the time period designated for the channel by clocking a timing element or counter at each of the channels through a clocking or strobe signal sent over the bus. The timing element or counter is updated responsive to the clocking signal, and the contents thereof may then be compared with a unique channel identifier. If the two are equal, the time period designated for a channel is determined to be present.

Method 500 may further comprise programming one or more of the channels with a predetermined value for the channel. In one example, the method further comprises remotely programming the one or more channels with the predetermined value for the channel.

The impedance presented by a channel to the bus during the designated time period may give rise to an impedance mismatch condition at the channel. The channel may then be interrogated during its designated time period by transmitting an analog pulse over the bus. The impedance mismatch at the channel causes at least a partial reflection of the pulse to return to a termination device coupled to one end of the bus, where the amplitude of the reflected pulse is representative of the impedance presented by the channel.

Method 500 may also comprise performing at least partial equalization of the transmitted pulses to compensate for variable attenuation caused by different distances between the termination device and each of the channels.

The signals for one or more of the channels may be combined into a data packet at the termination device. The packet may further be transmitted to a local controller, to a storage device, or to a remote location over a network.

The one or more signals may be processed using a programmable procedure. In one example, the procedure is remotely programmable. In another example, the procedure comprises a transformation applied to the one or more signals. In third example, the procedure comprises a feature extraction procedure. In a fourth example, the procedure combines the one or more values into a beam.

The procedure may comprise a search procedure. It may also comprise a predetermined mode or schedule for interrogating the channels. In one example, the procedure changes the order, timing, sequence, or frequency at which the channels are interrogated during a cycle. For instance, an example array may comprise 32 channels. In a first mode of operation, each of the 32 channels may be interrogated during a cycle. However, in a second remotely programmed mode of operation, only some of the channels may be interrogated during a cycle at a higher frequency of interrogation than in the first mode of operation.

Figure 7:
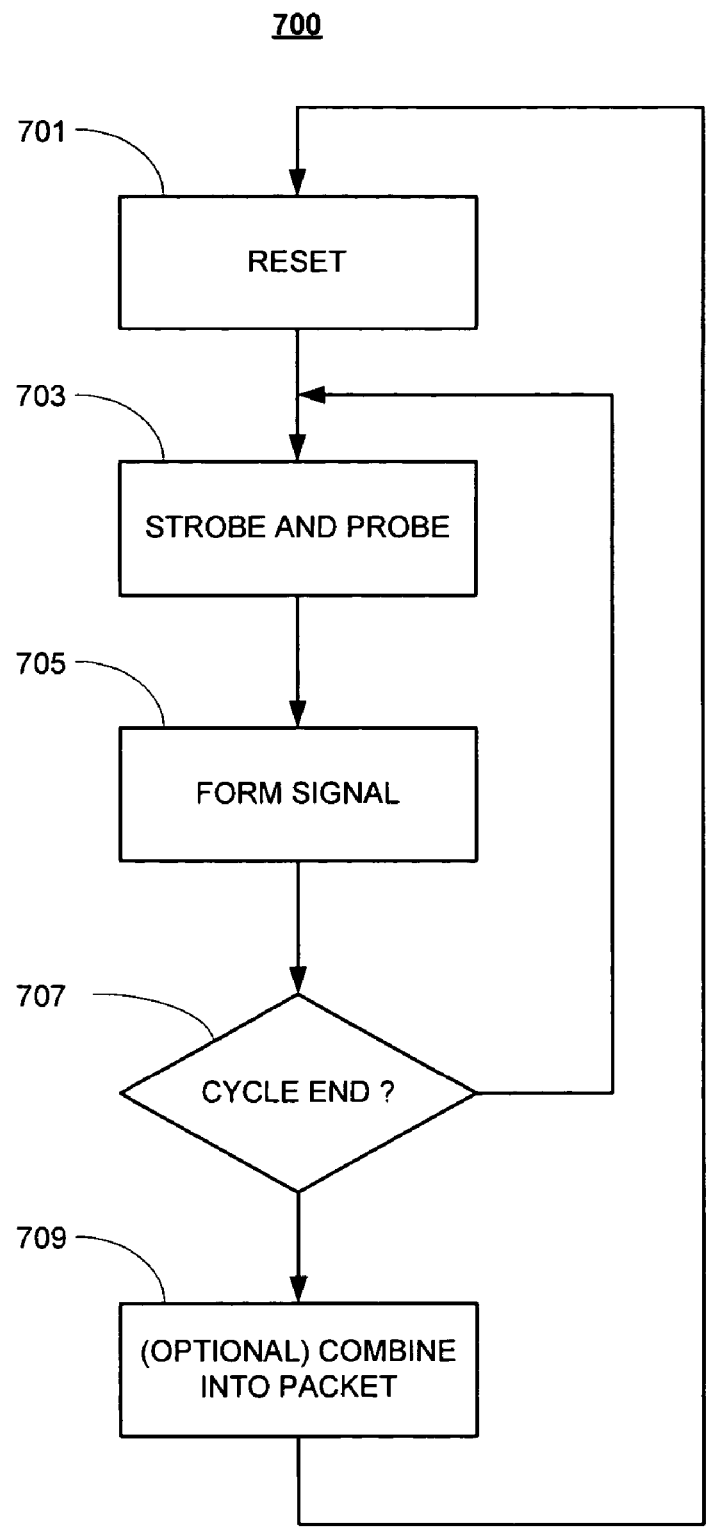
FIG. 7 is a flowchart of one implementation example of a method of telemetering one or more channels coupled to a bus.

FIG. 7 is a flowchart of an implementation 700 of a method of telemetering a plurality of channels coupled to a bus. In step 701, at the inception of a cycle, a sync signal is transmitted over the bus to each of the channels. The sync signal may cause a sample & hold circuit at each of the channels to sample at about the same time the amplitude of a sensed signal input to the circuit at the channel. In addition, the sync signal may cause a counter at each of the channels to sync.

In the next step 703, at the inception of or during a discrete time period within the cycle, a strobe signal and a probe pulse is transmitted over the bus to each of the channels. The strobe signal may cause a counter located at each of the channels to increment or decrement depending on the implementation. If the counter indicates that the designated time period for the channel has arrived, the channel may present an impedance to the bus which is representative of the sampled amplitude held by the sample & hold circuit at the channel. Each of the other channels may present an open circuit equivalent impedance to the bus such that the impedance presented by the one channel gives rise to an impedance mismatch. An analog probe pulse may be used to interrogate the channels. The impedance mismatch at the one channel causes a reflected version of the probe pulse, with the amplitude thereof modulated based on the impedance presented at the channel, to reflect back to the termination device which originated the probe pulse. The open circuit equivalent impedance presented by the other channels causes the pulse to terminate at these other channels.

In step 705, a signal is formed which is representative of the modulation of the reflected pulse from the one channel. This signal may be formed at the termination device.

In inquiry step 707, an inquiry is made whether there are still more time periods within the cycle. If so, a branch is made back to the beginning of step 703. If not, a branch is made to optional step 709. In optional step 709, the signals for one or more of the interrogated channels are combined into a digital packet. This packet may then be transmitted to a local controller or over a network. A branch may then made back to the beginning of step 701 for another cycle.

While various embodiments of the invention have been described, it will be apparent to those of ordinary skill in the art that many more embodiments and implementations are possible that are within the scope of this invention.

What is claimed is:

1. A telemetry system comprising:
a bus;
a plurality of channels each coupled to the bus; and
a control subsystem for (1) controlling the channels so that each one presents to the bus, during a time period designated for the channel, a channel characteristic representative of a signal sampled by the channel, (2) interrogating in an analog domain, during the time period designated for the channel, the characteristic presented by the channel, and (3) forming a signal representative of the characteristic presented by the channel during the designated time period; wherein the control subsystem comprises a termination device at one end of the bus;
wherein the control subsystem further comprises a distributed control element at each of the channels;
wherein the distributed control element in a channel identifies the time period designated for the channel within a cycle;

wherein the termination device clocks each of the distributed control elements through a clocking signal sent over the bus;

wherein each of the distributed control elements comprises a timing element which is updated responsive to the clocking signal, and the distributed control element identifies the time period designated for the channel based on a comparison of timing element contents with a predetermined value for the channel.

2. The system of claim 1 wherein each distributed control element is programmable with the predetermined value for the channel.

3. The system of claim 2 wherein each distributed control element is remotely programmable with the predetermined value for the channel.

4. A telemetry system comprising:

a bus;

a plurality of channels each coupled to the bus; and a control subsystem for (1) controlling the channels so that each one presents to the bus, during a time period designated for the channel, a channel characteristic representative of a signal sampled by the channel, (2) interrogating in an analog domain, during the time period designated for the channel, the characteristic presented by the channel, and (3) forming a signal representative of the characteristic presented by the channel during the designated time period;

wherein the channel characteristic presented by the channel is a channel impedance representative of the amplitude of a signal sampled by the channel;

wherein the impedance presented by the channel to the bus during the designated time period gives rise to an impedance mismatch condition at the channel;

wherein the control subsystem interrogates a channel during its designated time period by transmitting an analog pulse over the bus, and the impedance mismatch at the channel causes at least a partial reflection of the pulse to return to a termination device, with the amplitude of the reflected pulse being representative of the impedance presented by the channel.

5. The system of claim 4 wherein the control subsystem performs at least partial equalization of the transmitted pulses to compensate for variable attenuation caused by different distances between the termination device and each of the channels.

6. A method of telemetering one or more channels coupled to a bus comprising:

controlling the one or more channels so that each one presents to the bus, during a time period designated for the channel, a channel characteristic representative of a signal sampled by the channel;

interrogating in an analog domain, during the time period designated for the channel, the characteristic presented by the channel;

forming a signal representative of the characteristic presented by the channel during the designated time period;

identifying the time period designated for the channel within a cycle;

clocking a timing element at each of the channels through a clocking signal sent over the bus; and updating the timing element responsive to the clocking signal, and identifying the time period designated for the channel based on a comparison of timing element contents with a predetermined value for the channel.

7. The method of claim 6 further comprising programming one or more of the channels with the predetermined value for the channel.

8. The method of claim 7 further comprising remotely programming the one or more channels with the predetermined value for the channel.

9. A method of telemetering one or more channels coupled to a bus comprising:

controlling the one or more channels so that each one presents to the bus, during a time period designated for the channel, a channel characteristic representative of a signal sampled by the channel;

interrogating in an analog domain, during the time period designated for the channel, the characteristic presented by the channel; and forming a signal representative of the characteristic presented by the channel during the designated time period;

wherein the channel characteristic presented by the channel is a channel impedance representative of the amplitude of a signal sampled by the channel;

wherein the impedance presented by the channel to the bus during the designated time period gives rise to an impedance mismatch condition at the channel;

further comprising interrogating the channel during its designated time period by transmitting an analog pulse over the bus, and the impedance mismatch at the channel causes at least a partial reflection of the pulse to return to a termination device coupled to one end of the bus, with the amplitude of the reflected pulse being representative of the impedance presented by the channel.

10. The method of claim 9 further comprising performing at least partial equalization of the transmitted pulses to compensate for variable attenuation caused by different distances between the termination device and each of the channels.

* * * * *